(12) United States Patent
Farhangi et al.

(10) Patent No.: US 7,117,676 B2
(45) Date of Patent: Oct. 10, 2006

(54) APPARATUS FOR MIXING FLUIDS

(75) Inventors: Shahram Farhangi, Woodland Hills, CA (US); Kenneth M Sprouse, Northridge, CA (US); David R Matthews, Simi Valley, CA (US)

(73) Assignee: United Technologies Corporation, Hartford, CT (US)

( * ) Notice: Subject to any disclaimer, the term of this patent is extended or adjusted under 35 U.S.C. 154(b) by 99 days.

(21) Appl. No.: 10/397,881

(22) Filed: Mar. 26, 2003

(65) Prior Publication Data

US 2004/0187499 A1 Sep. 30, 2004

(51) Int. Cl.
*F02C 7/08* (2006.01)

(52) U.S. Cl. .............. 60/736; 60/737; 60/776
(58) Field of Classification Search ............ 60/776, 60/39.27, 737, 758, 760, 805, 723, 736; 431/7, 170

See application file for complete search history.

(56) References Cited

U.S. PATENT DOCUMENTS

| | | | | |
|---|---|---|---|---|
| 2,655,787 A | * | 10/1953 | Brown ............. | 60/39.23 |
| 2,930,192 A | * | 3/1960 | Johnson ........... | 60/746 |
| 3,914,096 A | * | 10/1975 | Schladitz ......... | 431/208 |
| 4,030,875 A | * | 6/1977 | Grondahl et al. .... | 60/753 |
| 4,072,007 A | * | 2/1978 | Sanday ........... | 60/723 |
| 4,628,687 A | * | 12/1986 | Strom ............. | 60/39.23 |
| 4,651,534 A | * | 3/1987 | Stroem ........... | 60/732 |
| 4,731,989 A | * | 3/1988 | Furuya et al. ..... | 60/775 |
| 4,928,481 A | * | 5/1990 | Joshi et al. ...... | 60/737 |
| 5,000,004 A | * | 3/1991 | Yamanaka et al. .. | 60/723 |
| 5,054,280 A | * | 10/1991 | Ishibashi et al. .. | 60/776 |
| 5,214,912 A | * | 6/1993 | Farrauto et al. ... | 60/777 |
| 5,319,923 A | * | 6/1994 | Leonard et al. .... | 60/39.23 |
| 5,395,235 A | * | 3/1995 | Lan-Sun Hung ..... | 431/352 |
| 5,450,725 A | * | 9/1995 | Takahara et al. ... | 60/737 |
| 5,461,864 A | * | 10/1995 | Betta et al. ..... | 60/723 |
| 5,497,611 A | * | 3/1996 | Benz et al. ...... | 60/776 |
| 5,575,153 A | * | 11/1996 | Ito et al. ....... | 60/737 |
| 5,836,164 A | * | 11/1998 | Tsukahara et al. .. | 60/733 |
| 5,938,427 A | * | 8/1999 | Suzuki et al. .... | 431/208 |

(Continued)

FOREIGN PATENT DOCUMENTS

DE 100 14 092 9/2000

(Continued)

OTHER PUBLICATIONS

Bernard Lewis, Ph.D., Sc.D. (Cantab.) and Guenther von Elbe, Ph.D. (Berlin), Combustion, Flames and Explosions of Gases, Second Edition, Academic Press, 1961, pp. 22-29, 56-65, 330-331.

(Continued)

*Primary Examiner*—William Rodriguez
(74) *Attorney, Agent, or Firm*—Harness Dickey & Pierce P.L.C.

(57) ABSTRACT

A premixer for a combustor to entrain a selected volume of fuel in an oxidizer to be combusted to heat the oxidizer. The combustor is for a gas powered turbine which employs the hypergolic or high energy air stream which will allow a fuel to be combusted in the absence of an additional ignition source. A heat exchanger and a catalyst combusts a first portion of fuel in air without the production of undesired chemical species. The catalyst is employed to lower the combustion temperature of the fuel to substantially eliminate selected chemical species. The fuel premixed in the air then encounters the catalyst and the fuel is combusted to increase the temperature of the air to an auto-ignition temperature so that no other ignition source is needed to combust additional fuel added later.

22 Claims, 4 Drawing Sheets

U.S. PATENT DOCUMENTS

| | | | |
|---|---|---|---|
| 6,109,018 A * | 8/2000 | Rostrup-Nielsen et al. | 60/777 |
| 6,189,314 B1 * | 2/2001 | Yamamoto et al. | 60/776 |
| 6,209,325 B1 * | 4/2001 | Alkabie | 60/737 |
| 6,289,667 B1 * | 9/2001 | Kolaczkowski et al. | 60/777 |
| 6,302,683 B1 * | 10/2001 | Vestin et al. | 431/7 |
| 6,386,862 B1 * | 5/2002 | Fujita et al. | 431/170 |
| 6,415,608 B1 * | 7/2002 | Newburry | 60/723 |
| 6,520,769 B1 * | 2/2003 | Tachihara et al. | 431/170 |
| 6,595,003 B1 * | 7/2003 | Dalla Betta et al. | 60/777 |
| 6,612,830 B1 * | 9/2003 | Berry et al. | 431/7 |
| 6,669,463 B1 * | 12/2003 | Beutel et al. | 431/7 |
| 6,709,264 B1 * | 3/2004 | Hermann et al. | 431/170 |
| 6,712,602 B1 * | 3/2004 | Kang et al. | 431/7 |
| 6,718,772 B1 * | 4/2004 | Dalla Betta et al. | 60/776 |
| 6,752,623 B1 * | 6/2004 | Smith et al. | 431/170 |
| 2002/0139119 A1 | 10/2002 | Touchton et al. | |
| 2003/0056519 A1 | 3/2003 | Newburry | |
| 2003/0192318 A1 * | 10/2003 | Sprouse et al. | 60/777 |
| 2003/0192319 A1 * | 10/2003 | Sprouse et al. | 60/777 |
| 2004/0000146 A1 * | 1/2004 | Inoue et al. | 60/776 |
| 2004/0003598 A1 * | 1/2004 | Farhangi | 60/777 |
| 2004/0048211 A1 * | 3/2004 | Martin et al. | 431/7 |

FOREIGN PATENT DOCUMENTS

| | | |
|---|---|---|
| JP | 60-064131 | 4/1985 |

OTHER PUBLICATIONS

Forman A. Williams, Combustion Theory, The Fundamental Theory of Chemically Reacting Flow Systems, 1965, pp. 186-201.

* cited by examiner

APPARATUS FOR MIXING FLUIDS

FIELD

The present invention relates to gas turbine power plants, and more particularly relates to fuel/air mixers for the combustors of the gas turbine power plant.

BACKGROUND

It is generally known in the art to power turbines with gases being expelled from combustion chambers. These gas powered turbines can produce power for many applications such as terrestrial power plants. In the gas powered turbine a fuel, such as a hydrocarbon (for example methane or kerosene) or hydrogen, is combusted in an oxygen rich environment. The oxygen is generally provided from atmospheric sources which also contains nitrogen and other compounds. These combustion systems often have high emissions of undesirable compounds such as nitrous oxide compounds (NOX) and carbon containing compounds. It is generally desirable to decrease these emissions as much as possible so that undesirable compounds do not enter the atmosphere. In particular, it has become desirable to reduce NOX emissions to a substantially low amount and more preferably to a point where emissions are virtually eliminated. Emissions of NOX are generally accepted to be non-existent if they are equal to or less than about one part per million volume of dry weight emissions.

In a combustion chamber, fuel, such as methane, is combusted in atmospheric air where temperatures generally exceed about 1420° C. (about 2600° F.). This is especially true if flame holding zones or high temperature pilot flames are used to stabilize the combustion process. When temperatures are generally above about 1420° C., the nitrogen and oxygen compounds, both present in atmospheric air, undergo chemical reactions which produce nitrous oxide compounds. The energy provided by the high temperatures allows the breakdown of dinitrogen and dioxygen, especially in the presence of other materials such as various metals, to produce NOX or $NO_X$ compounds such as $NO_2$ and NO.

Attempts have been made to reduce production of NOX compounds by initially heating the air before it enters the combustion chambers to an auto-ignition temperature. If the air enters the combustion chamber at or above an auto-ignition temperature, then pilot flames or recirculation flame holding zones are not necessary to combust the fuel. Auto-ignition temperatures are usually lower than pilot flame temperatures or the temperatures inside recirculation flame holding zones. One such method for heating air to the auto-ignition temperature is to mix the fuel in the air before it reaches the combustion chamber. This vitiated air, that is air which includes the fuel, is then ignited in a pre-burner where at least a portion of the entrained fuel is combusted. This raises the temperature of the air before it reaches the main combustion chamber. This decreases NOX production and emissions substantially. Nevertheless, NOX emissions still exist due to the initial pre-burning.

In view of the foregoing, it will be appreciated that it is desirable to decrease or eliminate pre-burning, thereby substantially eliminating all NOX emissions. Although the air is heated before entering the main combustion chamber, it may still need to be ignited in the combustion chamber to combust the remaining fuel. Therefore, an additional flame or arc is used to combust remaining fuel in the main combustion chamber. This reduces the temperature that the igniter must be at but still increases the temperature of the combustion chamber. In addition, no fuel is added to the air as it enters the combustion chamber. Rather all the fuel has already been entrained in the air before it enters the combustion chamber to be combusted. This greatly reduces control over where combustion occurs and the temperature in the combustion chamber.

Other attempts to lower NOX emissions include placing catalysts in catalytic converters on the emission side of the turbines. This converts the NOX compounds into more desirable compounds such as dinitrogen and dioxygen. These emission side converters, however, are not one hundred percent efficient thereby still allowing NOX emissions to enter the atmosphere. The emission converters also use ammonia $NH_3$, gas to cause the reduction of NOX to $N_2$. Undesirably, some of this ammonia is discharged into the atmosphere. Also, these converters are expensive and increase the complexity of the turbine and power production systems. Therefore, it is also desirable to eliminate the need for emission side catalytic converters.

Changing the flow path of a fluid, such as a gas, also is problematic. In particular, in many combustion systems, the flow of gases must be changed to move the fluid from an original direction or orientation to a second direction or orientation to properly operate the apparatus. For example, when an oxidizer is drawn from the exterior of the apparatus, it then generally must be redirected to a combustor. This can decrease the pressure as the flow of the fluid changes direction. However, the combustors operate most efficiently with a high pressure of the fuel and oxidizer in the combustion area. Therefore, it is desirable to produce a system that will allow for the fluids to change direction without substantially decreasing the pressure.

SUMMARY

The present invention is directed to a combustor and a fuel/oxidizer mixer for a gas powered turbine. The fuel/oxidizer mixer injects fuel into a stream of oxidizer to be combusted in the combustion chamber of the combustor. The fuel/oxidizer mixer includes a mixer chamber. Oxidizer flows from a first set of conduits into a mixing area within the mixer chamber. The oxidizer flows from the conduits through orifices or apertures, formed in the conduits into the mixing area. As the oxidizer flows through the orifices, fuel is injected from an injector plate into the mixing area. The orifice increases the flow area of the oxidizer to an area larger than the cross-sectional area of the conduit. Therefore, the velocity head of the oxidizer can be maintained and the pressure reduction can be substantially limited. In addition, the mixing area may include a substance or structure to substantially eliminate the possibility of combustion within the mixing area.

A first preferred embodiment includes a combustion system for use in a gas powered turbine which combusts a fuel in the presence of an oxidizer. The combustion system includes a first injector member to inject a first volume of fuel into a volume of the oxidizer. A mixer mixes the volume of oxidizer with the first volume of fuel. A heater heats the volume of oxidizer to form a volume of high energy oxidizer. A second injector member injects a second volume of fuel, including a high temperature, into the volume of high energy oxidizer. Substantially all the fuel provided through the second injector member reaches its high temperature at substantially the same time.

A second embodiment of the present invention includes a gas powered turbine. The turbine includes a compressor to produce compressed atmospheric air to provide an oxidizer for the gas powered turbine. A combustion system for mixing and combusting a fuel injected into the compressed atmospheric air to produce an expanding gas. A turbine fan is powered by the expanding gases. The combustion system includes a pre-heat area and a pre-mix area for mixing the fuel with the compressed air before the air enters the pre-heat area. The compressed air maintains a generally constant pressure from the compressor to the pre-heat area.

A third embodiment of the present invention includes a method of mixing a volume of a fuel with a volume of an oxidizer and providing the mixture to a heater through a mixer. The mixer includes a conduit defining an inlet, having an inlet volume, and an outlet, having an outlet volume, spaced apart from one another. The method includes flowing a fluid in a first direction in the conduit. The fluid is then expressed from the conduit. The expressed fluid may hen be flowed in a second direction at least 90 degrees to the first direction. A selected pressure of the fluid is maintained as it flows in the second direction.

Further areas of applicability of the present invention will become apparent from the detailed description provided hereinafter. It should be understood that the detailed description, while indicating various embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. Although the following description relates to a combustor for producing substantially no nitrous oxide compounds, this invention may be used with any fluid system.

Figure 1:
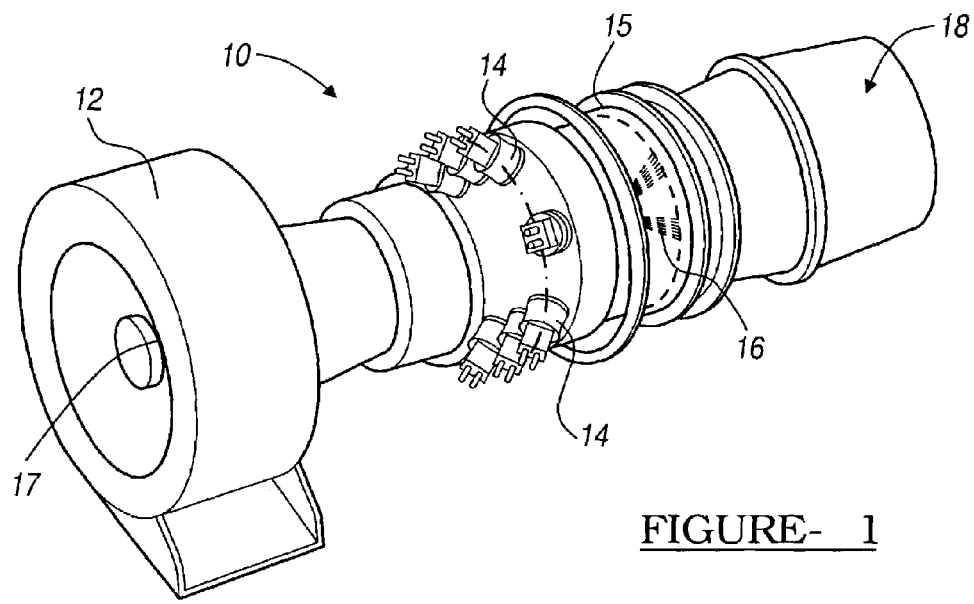
FIG. 1 is a perspective view of a gas powered turbine including a combustor in accordance with the present invention.

Referring to FIG. 1, a gas powered turbine in accordance with a preferred embodiment of the present invention is shown. The gas powered turbine 10 may use several different gaseous fuels, such as hydrocarbons (including methane and propane) and hydrogen, although mainly hydrocarbons are discussed herein other fuels may be used, that are combusted and that expand to move portions of the gas powered turbine 10 to produce power. One component of the gas powered turbine 10 is a compressor 12 which forces atmospheric air into the gas powered turbine 10. Atmospheric air is essentially an oxidizer in the turbine 10, and any other appropriate oxidizer may be used. Also, the gas powered turbine 10 includes several combustion chambers 14 for combusting fuel. The combusted fuel is used to drive a turbine 15 including turbine blades or fans 16 which are axially displaced in the turbine 15. Generally, a plurality of turbine fans 16 are incorporated, however, the actual number depends upon the power the gas powered turbine 10 is intended to produce. Only a single turbine fan 16 is illustrated here for clarity.

In general, the gas powered turbine 10 ingests atmospheric air, combusts a fuel in it, to produce expanding gases which are used to power the turbine fans 16. Essentially, air is pulled in and compressed by the compressor 12, which generally includes a plurality of concentric fans which grow progressively smaller along the axial length of the compressor 12. The fans in the compressor 12 are all powered by a single axle. The high pressure air then enters the combustion chambers 14 where fuel is added and combusted. Once the fuel is combusted, it expands out of the combustion chamber 14 and engages the turbine fans 16 which, due to aerodynamic and hydrodynamic forces, spins the turbine fans 16. The gases form an annulus which spins the turbine fans 16, which are, in turn, affixed to a shaft (not shown). Generally, at least two turbine fans 16 are incorporated. One or more of the turbine fans 16 engage the same shaft that the compressor 12 engages. The gas powered turbine 10 is self-powered since the spinning of the turbine fans 16 also powers the compressor 12 to compress air for introduction into the combustion chambers 14. Other turbine fans 16 are affixed to a second shaft 17 which extends from the gas powered turbine 10 to power an external device. After the gases have expanded through the turbine fans 16, they are expelled out through an exhaust port 18. It will be understood that gas powered turbines are used for many different applications such as engines for vehicles and aircraft or for power production in terrestrially based gas powered turbine power system.

The gases which are exhausted from the gas powered turbine 10 include many different chemical compounds that are created during the combustion of the atmospheric air in the combustion chambers 14. If only pure oxygen and pure hydrocarbon fuel were combusted, absolutely completely and stoichiometrically, then the exhaust gases would include only carbon dioxide and water. Atmospheric air, however, is not pure oxygen but also includes a majority nitrogen and other trace compounds. Therefore, in the high energy environment of the combustion chambers 14, many different compounds may be produced. All of these compounds are exhausted from the exhaust port 18. It is generally known in the art that an equivalence ratio is determined by dividing the actual ratio of fuel and air by a stoichiametric ratio of fuel to air (where there is not an excess of one starting material). Therefore, a completely efficient combustion of pure fuel and oxygen air would equal an equivalence ratio of one. It will be understood that although atmospheric air in a hydrocarbon fuel may be preferred for economic reasons other oxidizers and fuels may be provided. The air simply provides an oxidizer for the fuel to be combusted in. Therefore, other oxidizing materials such as pure oxygen may be used in the gas powered turbine 10. In addition, other fuels may be combusted which are not necessarily simply hydrocarbons. Regardless, the present invention may be used with any oxidizer or fuel which is used to power the gas powered turbine 10.

Figure 2:
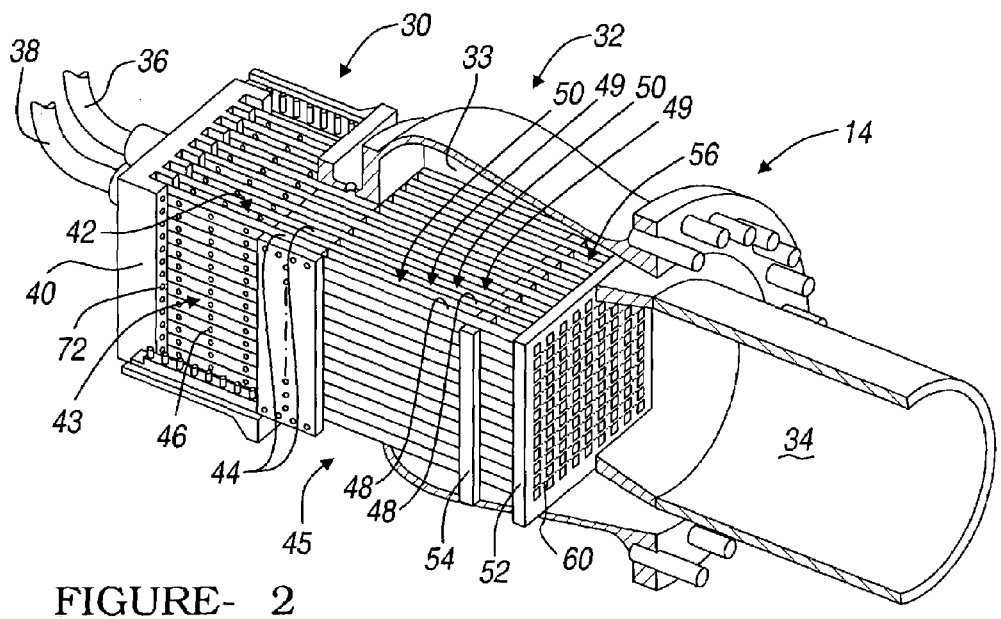
FIG. 2 is a partial cross-sectional perspective view of a single combustor, including a heat exchanger and mixing chamber.

It will be understood that the gas powered turbine 10 may include more than one combustion chamber 14. A reference to only one combustion chamber 14, herein, is merely for simplifying the following discussion. With reference to FIG. 2, an exemplary combustion chamber 14 is illustrated. The combustion chamber may comprise any appropriate combustion chamber such as the one described in U.S. patent application Ser. No. 10/120,268 filed Apr. 10, 2002 entitled, "A Catalytic Combustor For Substantially Eliminating Nitrous Oxide Emissions," incorporated herein by reference. The combustion chamber 14 includes a premix section or chamber 30, a heat exchange or pre-heat section 32, generally enclosed in a heat exchange chamber 33, and a main combustion section 34. A first or premix fuel line 36 provides fuel to the premix chamber 30 through a fuel manifold 37 while a second or main fuel line 38 provides fuel to the main combustion section 34 through a main injector 52.

Positioned in the premix chamber 30 is a premix injector 40 that injects fuel from the first fuel line 36 into a premix area 42 of a pre-mixer 43. Air from the compressor 12 enters the premix chamber 30 through a cooling tube or oxidizer conduit 44 of a heat exchanger or pre-heater 45 (detailed in FIG. 3). Each column 44a of cooling tubes 44 are spaced laterally apart, but not vertically apart, therefore a void is defined between each cooling tube column 44a. The premix area 42 is the void or volume defined between each column of the cooling tubes 44. Therefore, the premix chamber 30 generally includes a plurality of the pre-mix areas 44. Formed axially along an end of each of the cooling tubes 44 are a plurality of orifices 46. The orifices 46 provide a path for the oxidizer traveling through the cooling tubes 44 to exit into the premix areas 44. Therefore, the air may flow through the cooling tubes 44 out the orifices 46 and mix with fuel in the premix areas 44.

With further reference to FIG. 2, a plurality of catalytic heat exchange or catalyst tubes 48 extend into the heat exchange chamber 32. The heat exchange tubes 48 are spaced laterally apart, but they are not spaced vertically apart. This configuration creates a plurality of columns 49 of the heat exchange tubes 48. Each heat exchange tube 48, and the column 49 as a whole, define a catalyst pathway. The columns 49, in turn, define a plurality of channels 50 therebetween. Extending inwardly from the walls of the heat exchange chamber 33 are directing fins (not particularly shown). The directing fins direct the flow of air to the top and the bottom of the heat exchange chamber 33 so that air is directed to flow vertically through the channels 50 defined by the heat exchange tubes 48.

Near the ends of the heat exchange tubes 48, where the heat exchange tubes 48 meet the main combustion section 34, is a main injector 52. The second fuel line 38 provides fuel to the main injector 52 so that fuel may be injected at the end of each heat exchange tube 48. Spaced away from the main injector plate 52, towards the premix chamber 30, is an intra-propellant plate 54. The intra-propellant plate 54 separates the air that is traveling through the channels 50 and the fuel that is being fed to the fuel manifold region 56 between the main injector face 52 and intra-propellant plate 54. It will be understood that the intra-propellant plate 54 is effectively a solid plate, though not literally so in this embodiment. Because the heat exchange tubes 48 are spaced apart the intra-propellant plate 54 is segmented wherein one portion of the intrapropellant plate 54 is placed in each channel 50 between two columns 49.

Air that exits out the heat exchange tubes 48 is entrained with fuel injected from an injector port 60 formed in the main injector plate 52 and this fuel then combusts in the main combustion section 34. The main combustion section 34 directs the expanding gases of the combusted fuel to engage the turbine fans 16 so that the expanded gases may power the turbine 10.

Figure 3:
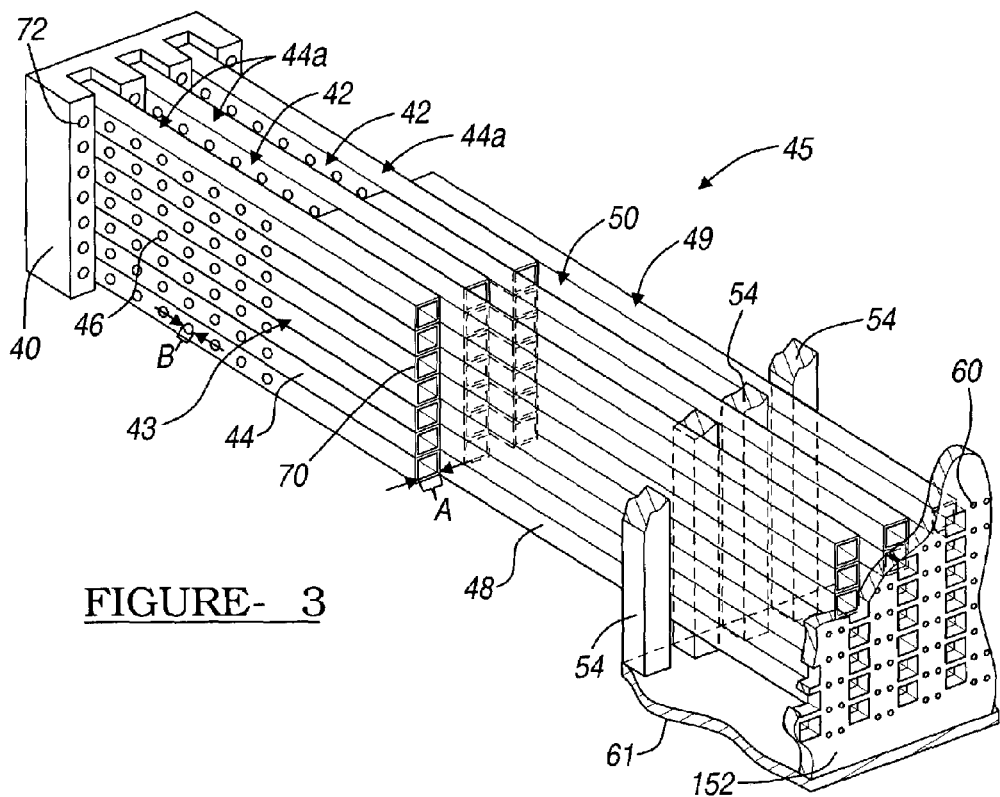
FIG. 3 is a detailed, partial cross-sectional, perspective view of a portion of the heat exchanger and mixing chamber including apertures according to a first embodiment of the present invention.

Turning to FIG. 3, an enlarged portion of the heat exchanger 45 including a catalyst is shown. Although the heat exchanger 45 and the pre-mixer 43 includes a large plurality of tubes, as generally shown in FIG. 2, only a few of the heat exchange tubes 48 and cooling tubes 44 are illustrated for greater clarity. The heat exchanger 45 includes a plurality of the cooling tubes 44 disposed parallel to and closely adjacent respective heat exchange tubes 48. Each of the cooling tubes 44 and the heat exchange tubes 48 have a generally rectangular cross section and can be made of any generally efficient thermally conductive material. Preferably, the heat exchange tubes 48 and the cooling tubes 44 are formed of stainless steel. It will be appreciated that while the cooling tubes 44 and the heat exchange tubes 48 are shown as being substantially square, the cross-sectional shape of the components could comprise a variety of shapes other than squares, such as rectangles or polygons. It is believed, however, that the generally square shape will provide the best thermal transfer between the tubes 44 and 48.

The cooling tubes 44 extend parallel to the heat exchange tubes 48 for a portion of the length of the heat exchange tubes 48. The cooling tubes 44 extend between the columns 49 of the heat exchanger tubes 48. The cooling tubes 44 and the heat exchange tubes 48 form a portion of the heat exchanger 45 which can provide a surface-to-surface exchange of heat. It will be understood, however, that air traveling in the channels 50 between the heat exchange tubes 48 will also become heated due to the heat transferred from the heat exchange tubes 48 to the air in the channels 50. That is thermal energy may be transferred directly from the heat exchange tubes 48 to the air traveling in the channels 50.

Referring further to FIG. 3, the fuel injector ports 60 are formed in the main injector 52. The injector ports 60 may be provided in any appropriate number, however, generally at a ratio of about 0.5 to about 2.5 injector ports 60 per heat exchange tube 48. The fuel is provided to the manifold region 56 which is bound by the inter-propellant plate 54, the main injector plate 52, and a manifold plate 61. The manifold plate 61 may underlay, overlay, or both the manifold region 56. This provides fuel to each of the injector ports 60 without requiring an individual fuel line to each injector port 60. Therefore, as air exits the heat exchange tube 48, fuel is injected from the injector port 60 to the stream of air emitted from each heat exchange tube 48. In this way, the fuel can be very efficiently and quickly distributed throughout the air flowing out of the heat exchanger 45, as discussed further herein.

Preferably, the interior walls of each heat exchange tube 48 is coated with a catalyst. The catalyst may be any appropriate catalyst that is able to combust a hydrocarbon fuel, but preferably includes a mixture of platinum and palladium. The catalyst is able to combust a hydrocarbon fuel, such as methane, without the presence of a flame or any other ignition source. The catalyst is also able to combust the fuel without generally involving any side reactions. Therefore, the combustion of fuel does not produce undesired products. It will be understood that if the fuel is not a hydrocarbon then a different, appropriate catalyst is used. The catalyst allows combustion of the fuel without an additional heat source. It will be understood, however, that the present invention may be used without a catalyst coated on the heat exchange tubes 48. The catalyst simply allows the combustion of the fuel without an ignition source.

With additional reference to FIG. 3, a portion of the premix chamber 43 is illustrated in greater detail. It is more easily seen that a plurality of the cooling tubes 44 are stacked vertically to form the cooling tube column 44*a*. Each cooling tube 44 and the plurality of cooling tube columns 44*a* define a cooling pathway. Therefore, air can enter the combustor 10, travel through the channels 50, adjacent the heat exchange tubes 48, and through the cooling pathway defined by each of the cooling tubes 44. The cooling tubes 44, therefore, include an inlet 70. The inlet 70 is where the air enters the cooling tube 44 from the heat exchange channel 50. The cooling tube inlet 70 defines an inlet area A through which air may travel. The cooling tube inlet 70 is what allows the air to enter the cooling tube 44 as it travels to the premixer 43. In the premixer 43, each of the cooling tubes 44 defines a plurality of exit orifices or ports 46. Each of the exit orifices 46 include an exit area B. The air traveling through the cooling tubes 44 can exit the exit orifices 46 to enter the premix areas 42. Each exit orifice area B is generally smaller than the inlet area A, however, the total area of all of the exit orifice areas B may be equal to or greater than the inlet area A. Moreover, each of the cooling tubes 44 preferably includes a plurality of the exit orifices 46. Therefore, the total exit orifice area B for each cooling tube 44 is greater than the inlet area A. The specific ratio will depend upon the operating conditions, such as temperature or fuel type, for the combustor 10.

Each of the exit orifices 46 may have a different exit diameter B. Therefore, a first exit orifice 46A may have a first exit orifice area Ba while a second exit orifice 46B has a second orifice area Bb. The exit orifice areas B may be selected to alter the equivalence ratio of the air to the fuel and may also be used to directly control the flow of the oxidizer from the cooling tubes 44 out of the exit orifices 46.

The premix injector 40 includes a plurality of premix fuel injectors 72. Once the air exits the exit orifices 46 into the premix area 42, fuel is injected through the premix injector ports 72 to mix with the air that exits the cooling tubes 44. The number of premix injector ports 72 will depend upon the particular application and the fuel chosen to be combusted. Nevertheless, the ratio of the premix injector port 72 to cooling tubes 44 is generally between about 0.3 and about 2.5.

After the air enters the premix chamber 42, it then flows out of the premix chamber 42 through the pathway formed by the heat exchange tubes 48. In the heat exchange tubes 48, the fuel in the air combusts as it engages the catalyst which has been coated on the inside walls of the heat exchange tubes 48. As the fuel combusts, the temperature of the air rises to between about 768° C. and 930° C. (between about 1400° F. and about 1700° F.). As the temperature of the air rises, it becomes highly energetic to form high energy air, wherein high energy air exits the heat exchange tubes 48. The temperature that the high energy air reaches in the heat exchange tubes 48 is at least the hypergolic or auto-ignition temperature of the fuel being used in the gas powered turbine 10. Therefore, the high energy air that exits the heat exchange tubes 48 is, and may also be referred to as, hypergolic or auto ignition air. The auto-ignition temperature of the air is the temperature that the air may be at or above so that when more fuel is injected into the hypergolic air the fuel ignites automatically without any other catalyst or ignition source.

Additional fuel is injected through the main injector 52 as the air exits the heat exchange tubes 48 and enters the main combustion section 34. The fuel injected from the main injector 52 is injected through the individual injector ports 60. Therefore, all of the air exiting the heat exchanger 45 is thoroughly mixed with fuel. Any additional fuel to power the gas powered turbine 10 is injected at this point, such that fuel is only added to the air at the premix chamber 42 and from the injector port 60. Although several forms of the injector ports 60 may be used, one form is described in U.S. patent application Ser. No. 10/189,711, entitled "INJECTOR APPARATUS AND METHOD FOR COMBUSTING A FUEL FOR A GAS POWERED TURBINE," incorporated herein by reference.

Figure 4:
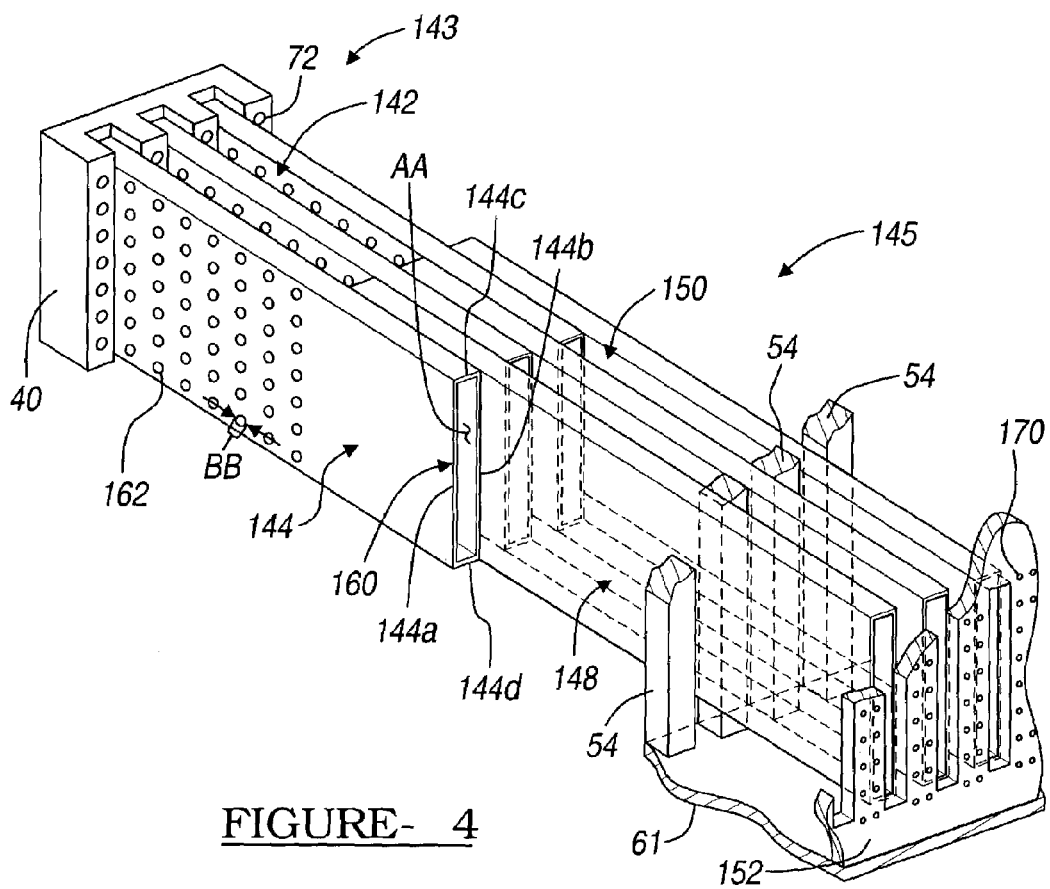
FIG. 4 is a detailed, partial cross-sectional, perspective view of a portion of the heat exchanger and the mixing chamber according to the second embodiment.

With reference to FIG. 4, a detail portion, similar to the portion illustrated in FIG. 3, of an alternative preferred heat exchanger 145 and pre-mixer 143 is illustrated. A premixer 143 allows air from the compressor to be mixed with a first portion of fuel. Air comes from the compressor and travels through a cooling fin 144 rather than through a plurality of cooling tubes 44, as discussed above in relation to the first embodiment. The cooling fin 144 is defined by two substantially parallel plates 144*a* and 144*b*. It will be understood, however, that other portions, such as a top 144*c* and a bottom 144*d* will be included to enclose the cooling fin 144. Each cooling fin 144 defines a column here, rather than a plurality of the cooling tubes 44. Moreover, a premix area 142 is defined by two of the cooling fins 144 rather than a plurality of the cooling tubes 44. Additionally, a heat exchange or catalyst fin 148 is provided rather than heat exchange tubes 48, as discussed above in the first embodiment. Again, the catalyst fin 148 is defined by a top, and a bottom, and walls wherein the walls define a column 149.

The cooling fin 144 may include a plurality of cooling fins 144. Each cooling fin 144, in the plurality, defines a cooling pathway. Similarly, the heat exchange fin 148 may include a plurality of heat exchange 148 fins. Each, or the plurality of, the heat exchange fins 148 defines a heat exchange or catalyst pathway.

Figure 3A:
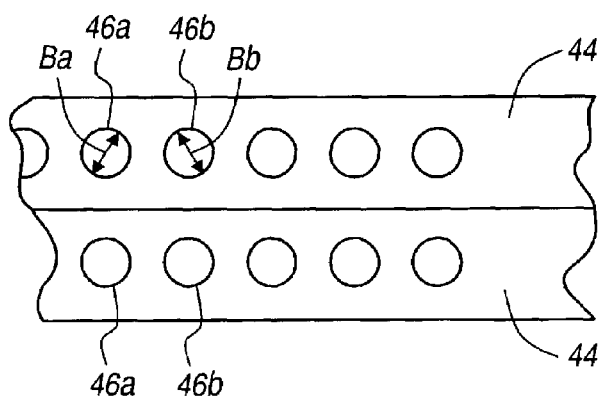
FIG. 3*a* is a detailed, partial cross-sectional, perspective view of a portion of the heat exchanger and mixing chamber, including apertures according to a second embodiment of the present invention.

Channels 150 are still provided between each of the catalyst fins 148 so that air may flow from the compressor through the cooling fins 144 into the premixer 143. Air is able to travel through the channels 150 to a cooling fin inlet 160. The cooling fin inlet 160 has an area AA defined by the cooling fin 144. The air then travels into the premixer 143 where it exits the cooling fin 144 through exit orifices 162. Each exit orifice has an area BB, which is defined by the cooling fin 144. Any appropriate number of the exit orifices 162 can be formed in each of the cooling fins 144. The number and size of the exit orifices 162 is dependent upon the particular application, such as the fuel chosen. Moreover, the exit area BB of the exit orifices 162 may vary in a particular apparatus as discussed and illustrated in relation to FIG. 3*a*. Regardless, the combined exit orifice area BB of all the exit orifices 162 is generally equal to or greater than the inlet area AA. It will be understood, however, that the ratio of the inlet area AA to the combined exit orifice area BB will also depend upon the particular application and can be altered between differing applications. After the air exits the exit orifices 162, it enters the premix areas 142. The first portion of fuel is injected from the premix injector 40 through the premix injector ports 72. Air is then premixed with the first portion of fuel from the premix injector 40 and flows back through the catalyst fins 148 to the main injector plate 152.

Injection ports 170 are provided on the main injector plate 152 to inject fuel as the air exits the catalyst fin 148. A suitable number of injection ports 170 are provided so that the appropriate amount of fuel is mixed with the air as it exits the catalyst fins 148. Any appropriate form of the injector ports 170 may be used as described above. An intra-propellant plate 54 and fuel manifold 61 are provided to direct the fuel to the injector ports 170 in the main injector plate 152.

With continuing reference to FIGS. 1–3 and further reference to FIG. 5, the gas powered turbine 10 operates as generally described below. Although the first embodiment, illustrated particularly in FIG. 3, will be described below, it will be understood that the second embodiment, illustrated particularly in FIG. 4, will operate substantially similarly to the below described method. A volume of atmospheric air, or any other appropriate oxidizer, is first forced from the compressor 12 into the heat exchange chamber 33. The air then travels through the channels 50 and through the cooling tubes 44 into the premix chamber 30 through the cooling tubes 44. The air enters the cooling tubes through the cooling tube inlet 70 and passes the inlet area A. The air then travels through the cooling tubes 44 into the premixer 43 and exits the exit orifices 46. A certain volume of the air may exit each of the exit orifices 46 as the air enters the premix areas 42. As the air is exiting the cooling tubes 44, the first portion of fuel is being mixed with the air in the premixer 43. The first portion of fuel is injected from the premixer injector ports 72 of the premix injector 40. The premixed fuel and air then travels downstream through the heat exchange tubes 48 where the air is expelled from the heat exchange tubes 48, passed the main injector 52, and into the combustion area 34 as hypergolic air.

The air becomes hypergolic air as it travels through the heat exchange tubes 48. The premix portion of fuel that was mixed in the premixer 43 is combusted by the catalyst coated on to the interior of the heat exchange tubes 48. This raises the temperature of the air from the temperature that the air enters the heat exchange chamber 33. For example, the temperature of the air is raised to between about 700° C. and about 880° C. (between about 1300° F. and about 1600° F.). This temperature is generally about the hypergolic temperature of the hydrocarbon fuel, so that the hydrocarbon fuel combusts spontaneously when added through the main injector plate 52. It will be understood that different fuels have different hypergolic temperatures and therefore, differing amounts of premixed fuel or different catalysts may be used to achieve these temperatures.

Figure 5:
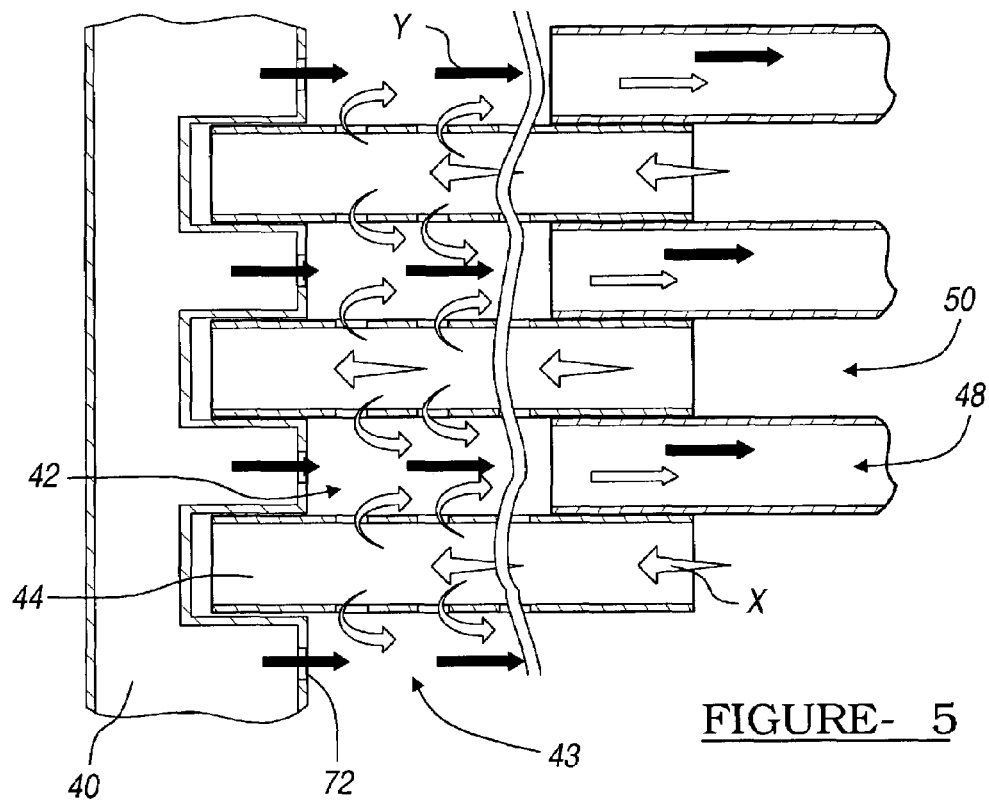
FIG. 5 is a detailed partial plan view of the mixing chamber and heat exchanger illustrating a flow of fluids according to an embodiment of the present invention.

With additional reference to FIGS. 4 and 5, it can be seen that the air enters the premixer 43 traveling in a direction of arrow X. In contrast to this, the air enters the heat exchange tubes 48 travelling in a direction of arrow Y. It can be seen, therefore, that the air must make a turn of about 180° to change direction from the direction arrow X it enters the premixer 43 to the direction arrow Y that it enters the heat exchange tubes 48. Generally, when a fluid is required to change directions so drastically, a pressure drop may occur.

For example, air generally passes through the cooling tubes 44 having a velocity head of at least about 2.3 psi. Using one exemplary total area of the exit orifices 62, the velocity head of the air exiting the cooling tubes 44 is about 1 psi. This creates a pressure drop of less than about 1.5 psid, rather than about 3.5 psid if the exit orifices 62 were not used. That is, if the air is simply dumped into the premixer 43 from the cooling tubes 44, rather than exiting at the plurality of the exit orifices 62, the pressure drop would be significantly greater than requiring the air to exit through the exit orifices 62.

This pressure change occurs because the pressure change is proportional to the velocity head. Any change in the velocity of the fluid results in a squared proportional change to the pressure. Therefore, reducing the velocity head reduces the pressure change as the air changes direction in the premixer 43. The decrease in the velocity head is generally achieved because the combined area of the exit orifice areas B of the exit orifices 62 is greater than the inlet area A of the cooling inlet 70. Therefore, a greater volume of air exits the cooling tubes 44 per unit of time to maintain a selected pressure or substantially reduce a pressure drop.

Figure 6A:
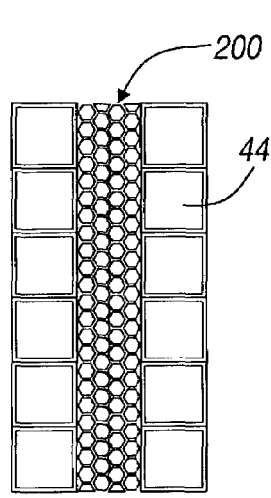
FIG. 6*a* is a detailed view coaxial with the flow of the mixed oxidizer and fuel through the mixing chamber.
Figure 6B:
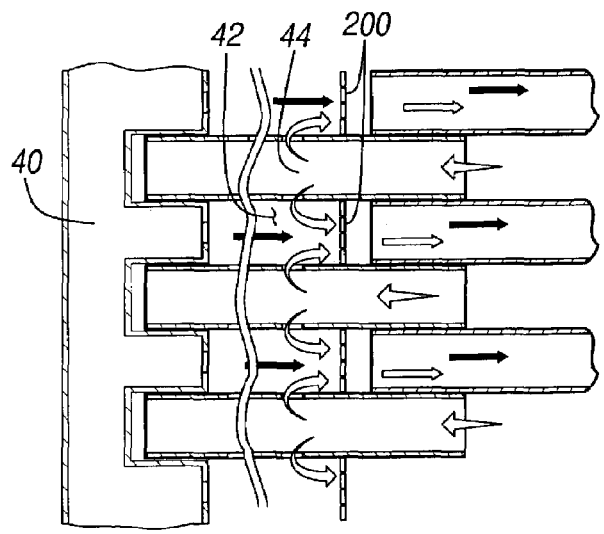
FIG. 6*b* is a detailed plan view of a portion of the mixing chamber and the heat exchanger, including the first embodiment of the premature combustion inhibitor.

With continuing reference to the above figures and reference to FIGS. 6a and 6b, a premature combustion suppression apparatus 200 is illustrated. As discussed herein the suppression apparatus 200 can act as a combustion suppressor either alone, alternative to, or in combination with other portions. In the premixer 43, a first portion of fuel is mixed with air in the premix area 42. This mixture of air and fuel then travels down the premix area 42 and into the catalyst tubes 48. The fuel entrained in the air, however, may reach conditions in the premix areas 42, which would generally allow it to combust. Specifically, right after the fuel is injected in the air in the premix areas 42, the equivalence ratio would generally be about infinity. Contrary, by the time the fuel entrained in the air reaches the catalyst tubes 48, the equivalence ratio would generally be less than about one. This means that at some point between the premix injector face 40 and the entrance to the heat exchange tubes 48, the equivalence ratio will be about one. At this point, it is substantially likely that the fuel entrained in the air traveling through the premix areas 42 will attempt to combust.

The suppression apparatus 200 is placed in the premix areas 42 to substantially inhibit the premature combustion of the fuel in the premix areas 42. The premature combustion inhibitor 200 can take any appropriate shape or form, but is generally a screen defining honeycomb-shaped voids that fill the vertical distance of the premix area 42. The length of each of the channels through the premature combustion inhibitor 200 will vary depending upon the fuel that is used. Nevertheless, the distance is at least equal to the quenching distance for the fuel that is to be combusted in the combustor 14. For many combustible gases, the quenching distance is at least about 0.0635 cm (about 0.025 inches). The quenching distance is generally known in the art, but generally is defined as the distance, which is less than or equal to the distance, which inhibits combustion of a particular gas. Specifically, the gas does not combust when it is constricted to such a small distance. Therefore, placing the premature combustion inhibitor 200 in the premix areas 42 substantially inhibits or eliminates the combustion of the gas in the premix areas 42. Therefore, the fuel remains entrained in the air as it travels through the premix areas 42 until it reaches the catalyst tubes 48 where it combusts due to the presence of a catalyst.

Figure 7:
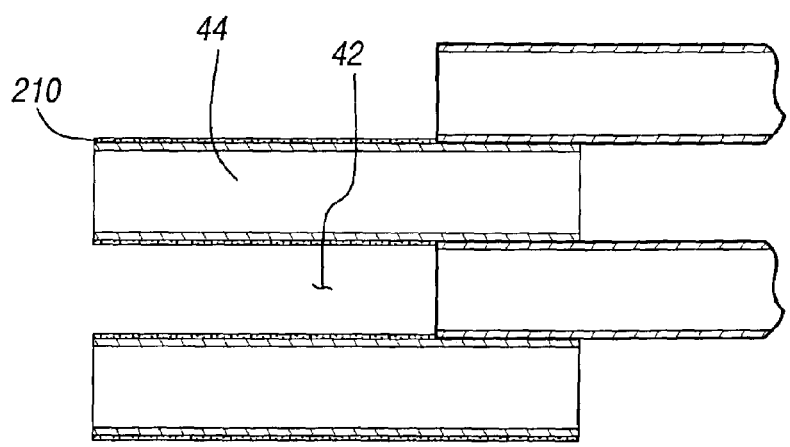
FIG. 7 is a detailed plan view of the mixing chamber including the premature combustion inhibitor according to a second embodiment of the present invention.

With reference to FIG. 7, another embodiment for substantially eliminating or inhibiting combustion of the fuel before it reaches the catalyst tubes includes placing an inhibiting coating 210 on the exterior of the cooling tubes 44 so that the inhibiting coating 210 engages the premix areas 42. The coating 210, either alone or in combination, can act as a combustion suppressor. Various known coatings can be used, but generally include salts, which destroy pre-oxyl ($HO_2$) radicals. These salts are used to prevent the ignition of combustible gases that are entrained in the air before it reaches the catalyst tubes 48. Again, this allows the fuel to remain entrained in the air in an uncombusted form before it reaches the catalyst tubes 48.

As discussed above, the air that exits the heat exchanger 45 is at the auto-ignition or hypergolic temperature of the fuel used in the gas powered turbine 10. Therefore, as soon as the fuel reaches the temperature of the air, the fuel ignites. Since the fuel has been thoroughly mixed with the air, using the fuel injector ports 60, 170, the combustion of the fuel is nearly instantaneous and will not produce any localized or discrete hot spots. Since the fuel is so well mixed with the air exiting the heat exchanger 45, 145, there will be no one point or area which has more fuel than any other point, which could also create hot spots in the main combustion section 34. Therefore, the temperature of the air coming from the main injector 52 and into the main combustion section 34 is substantially uniform. During operation of the gas powered turbine 10, the fuel's characteristic mixing rate is shorter than the combustion rate of the fuel.

The temperature of the air, after the additional fuel has been combusted from the main injector 52, is between about 1315° C. and 1595° C. (about 2400° F. and about 2800° F.). Preferably, the temperature, however, is not more than about 1426° F. (about 12600° F.). Different fuel to air ratios may be used to control the temperature in the main combustion section 34. The main combustion section 34 directs the expanding gases into a transition tube (not shown) so that it will engage the turbine fans 16 in the turbine area 15 at an appropriate cross sectional flow shape.

The use of the heat exchanger 45 raises the temperature of the air to create hot or heated air. The hot air allows the catalyst to combust the fuel that has been entrained in the air in the premix chamber 42 without the need for any other ignition sources. The catalyst only interacts with the hydrocarbon fuel and the oxygen in the air to combust the fuel without reacting any other chemical species. Therefore, the products of the combustion in the heat exchange tubes 48 are substantially only carbon dioxide and water due to the catalyst placed therein. No significant amounts of other chemical species are produced because of the catalyst. Also, the use of the heat exchange tubes 48, with a catalyst coated therein, allows the temperature of the air to reach the auto-ignition temperature of the fuel so that no additional ignition sources are necessary in the main combustion section 34. Therefore, the temperature of the air does not reach a temperature where extraneous species may be easily produced, such as NOX chemicals. Due to this, the emissions of the gas powered turbine 10 of the present invention has virtually no NOX emissions. That is, that the NOX emissions of the gas powered turbine 10 according to the present invention are estimated to be generally below about 1 part per million volume dry gas.

Also, the use of the heat exchanger 45 eliminates the need for any other pre-burners to be used in the gas powered turbine 10. The heat exchanger 45 provides the thermal energy to the air so that the catalyst bed is at the proper temperature. Because of this, there are no other areas where extraneous or undesired chemical species may be produced. Additionally, the equivalence ratio of the premix area is generally between about 0.20 and 0.30, while the equivalence ratio of the main injector 52 is between about 0.50 and about 0.60. This means that the fuel combustion will occur as a lean mixture in both areas. Therefore, there is never an excessive amount of fuel that is not combusted. Also, the lean mixture helps to lower temperatures of the air to more easily control side reactions. It will be understood that different fuel ratios may be used to produce different temperatures. This may be necessary for different fuels.

The present invention thus provides an apparatus and method that virtually or entirely eliminates the creation of NOX emissions. Advantageously, this is accomplished without significantly complicating the construction of the gas powered turbine 10 or the combustors 14.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A combustion system for use in a gas powered turbine which combusts a fuel in the presence of an oxidizer comprising:
   a first injector member to inject a first volume of fuel into a volume of said oxidizer;
   a mixer to mix said volume of oxidizer with said first volume of fuel;
   a heater to heat said volume of oxidizer to form a volume of high energy oxidizer;
   a second injector member to inject a second volume of fuel into said volume of high energy oxidizer;
   wherein substantially all the fuel provided through said second injector member reaches a temperature at substantially the same time;
   wherein said heater comprises:
      a fuel supply system to provide said first volume of said fuel to said volume of oxidizer:
      a heat exchanger including:
         a heater pathway extending along a first axis;
         a cooling pathway extending along a second axis;
         wherein said heater pathway is in thermal contact with said cooling pathway;
         wherein the oxidizer is adapted to first flow through said cooling pathway and then through said heater pathway; and
      wherein said volume of oxidizer is adapted to first flow past said heater pathway through said cooling pathway, thereby receiving thermal energy from said heater pathway.

2. The combustion system of claim 1,
   wherein said heater pathway comprises a plurality of heater tubes, that form a plurality of heater tube columns, each of said heater tube columns is spaced apart transversally to said first axis and defining a plurality of channels adapted for allowing the oxidizer to flow therethrough;
   wherein said cooling pathway comprises a plurality of cooling tubes that form a plurality of cooling tube columns, each of said cooling tube columns is spaced apart transversally to said second axis; and
   wherein said cooling tubes extend substantially adjacent said heater tubes along said second axis for at least a portion of the length of said heater tubes.

3. A combustion system for use in a gas powered turbine which combusts a fuel in the presence of an oxidizer comprising:
   a first injector member to inject a first volume of fuel into a volume of said oxidizer;
   a mixer to mix said volume of oxidizer with said first volume of fuel;

a heater to add energy to said volume of oxidizer to form a volume of high energy oxidizer;

a second injector member to inject a second volume of fuel into said volume of high energy oxidizer;

wherein substantially all the fuel provided through said second injector member reaches a temperature at substantially the same time;

wherein said mixer comprises:

a plurality of conduits defining at least a portion of a coolant pathway, each conduit including at least one wall and an inlet defining an inlet area;

said wall defining at least one outlet aperture having an outlet aperture area;

wherein a fluid flows into said conduit through said inlet area and out through said outlet aperture; and wherein a velocity head of said fluid exiting said outlet apertures is less than a velocity head of said fluid flowing through said conduit.

4. The combustion system of claim 3, wherein:

said plurality of conduits are arranged into at least two columns defining a void therebetween;

said first injector injects said first volume of fuel into said void;

said volume of oxidizer exits said outlet apertures into said void to mix with said first volume of fuel; and said outlet apertures reduce the velocity head of said oxidizer to assist in achieving a selected pressure of said oxidizer and said volume of fuel.

5. The combustion system of claim 3, wherein each of said plurality of conduits define a column and two respective columns define a void therebetween;

said first injector injects said first volume of fuel into said void;

said volume of oxidizer exits said outlet apertures into said void to mix with said first volume of fuel; and said outlet apertures reduce the velocity head of said oxidizer to assist in achieving a selected pressure of said oxidizer and said volume of fuel.

6. A combustion system for use in a gas powered turbine which combusts a fuel in the presence of an oxidizer comprising:

a first injector member to inject a first volume of fuel into a volume of said oxidizer;

a mixer to mix said volume of oxidizer with said first volume of fuel;

a heater to add energy to said volume of oxidizer to form a volume of high energy oxidizer;

a second injector member to inject a second volume of fuel into said volume of high energy oxidizer; and a combustion suppressor disposed in said mixer to substantially eliminate any combustion of said first volume of fuel before said first volume of fuel enters said heater;

wherein substantially all the fuel provided through said second injector member reaches a temperature at substantially the same time.

7. The combustion system of claim 6, further comprising:

a mixing area, wherein said first volume of fuel and said volume of oxidizer are mixed in said mixing area before entering said heater; and wherein said combustion suppressor includes a member disposed in said mixing area to reduce a distance of said mixing area to at least a quenching distance of said fuel.

8. The combustion system of claim 6, further comprising:

at least two conduits spaced apart to define a mixing area;

a coating disposed on an exterior of said conduits;

wherein said first volume of fuel and said volume of oxidizer are mixed in said mixing area before entering said heater; and wherein said coating substantially inhibits combustion of said fuel.

9. A gas powered turbine, comprising:

a compressor to produce compressed atmospheric air to provide an oxidizer for the gas powered turbine;

a combustion system for mixing and combusting a fuel injected into the compressed atmospheric air to produce an expanding gas;

a turbine fan which is powered by the expanding gases:

said combustion system includes:

a pre-heat area; and a pre-mix area for mixing the fuel with the compressed air before the air enters the pre-heat area; and wherein said compressed air maintains a generally constant pressure from said compressor to said pre-heat area.

10. The gas powered turbine of claim 9, further comprising:

a first fuel line to supply a first portion of fuel to the compressed atmospheric air which is used in the pre-heat area to heat the compressed atmospheric air to a hypergolic temperature so as to produce a volume of hypergolic air;

a second fuel line to supply a second portion of said volume of fuel to hypergolic air;

a first injector system to provide said second portion of fuel to said volume of hypergolic air before any substantial portion of said second portion of fuel combusts; and wherein substantially all of said second portion of fuel combusts at substantially the same time such that the gas powered turbine emits substantially only selected chemical compounds.

11. The combustion system of claim 9, wherein said pre-mix area includes:

a plurality of conduits defining at least a portion of a coolant pathway, each conduit including at least one wall and an inlet defining an inlet area;

said wall defining at least one outlet aperture having an outlet aperture area;

wherein said compressed air flows into said conduit through said inlet area and out through said outlet aperture; and wherein a velocity head of said compressed air exiting said outlet apertures is less than a velocity head of said compressed air flowing through said conduit.

12. The combustion system of claim 11, further comprising:

a second injector system;

wherein said plurality of conduits are arranged into at least two columns defining a void therebetween;

said second injector system injects said first volume of fuel into said void;

said volume of compressed air exits said outlet apertures into said void to mix with said volume of fuel; and said outlet apertures reduce a velocity head of said compressed air to assist in maintaining a selected pressure of said compressed air and said volume of fuel.

13. The combustion system of claim 11, further comprising:

a second injector system;

wherein each of said plurality of conduits define a column and two respective columns define a void therebetween;

wherein said second injector system injects a first volume of fuel into said void;

wherein said volume of compressed air exits said outlet apertures into said void to mix with said first volume of fuel; and wherein said outlet apertures reduce a velocity head of said compressed air to assist in maintaining a selected pressure of said compressed air and said volume of fuel.

14. The turbine of claim 9, wherein said pre-heat area includes a heat exchanger including:

a heater pathway extending along a first axis;

a cooling pathway extending along a second axis which is parallel to said first axis;

wherein said heater pathway forms a plurality of columns, spaced transversally to said first axis, and defines a plurality of channels; and wherein said cooling pathway extends a distance along said heater pathway and generally perpendicular to said channels.

15. The turbine of claim 14, wherein said heater pathway includes a plurality of heater tubes and said cooling pathway includes a plurality of cooling tubes.

16. The combustion system of claim 9, further comprising:

a combustion suppressor disposed in said pre-mix to substantially eliminate any combustion of said fuel before said fuel enters said pre-heater.

17. The combustion system of claim 16, further comprising:

a mixing area, wherein said fuel and said compressed air are mixed in said mixing area before entering said pre-heater; and wherein said combustion suppressor includes a member disposed in said mixing area to reduce a distance of said mixing area to at least a quenching distance of said fuel.

18. The combustion system of claim 16, further comprising:

at least two conduits spaced apart to define a mixing area;

a coating disposed on an exterior of said conduits;

wherein said fuel and said compressed air are mixed in said mixing area before entering said pre-heater; and wherein said coating substantially inhibits combustion of said fuel.

19. A method of mixing a volume of a fuel with a volume of an oxidizer and providing said mixture to a heater with a mixer, the mixer including a conduit defining an inlet, having an inlet volume, and an outlet, having an outlet volume, spaced apart from one another, the method comprising:

flowing a fluid in a first direction in said conduit;

expressing said fluid from said conduit;

flowing said expressed fluid in a second direction at least 90 degrees to said first direction; and maintaining a selected pressure of said fluid as it flows in said second direction.

20. The method of claim 19, further comprising:

flowing said expressed fluid through a passage;

inhibiting a combustion of said fuel in the mixer; and wherein said passage includes a quenching distance.

21. The method of claim 19, further comprising:

flowing said expressed fluid through a passage defined by an exterior of said conduits; and inhibiting a combustion of said fuel in said mixer by disposing a coating on said exterior to inhibit combustion of said fuel.

22. The method of claim 19, wherein maintaining a selected pressure includes:

decreasing a velocity head of said oxidizer as it exits said conduit by forming said outlet area to be greater than said inlet area, wherein a lower velocity oxidizer exits said conduit than enters said conduit.

* * * * *